(12) United States Patent
Wordley

(10) Patent No.: US 8,913,882 B2
(45) Date of Patent: Dec. 16, 2014

(54) AUTO CATCH-UP

(71) Applicant: Eldon Technology, Ltd., Steeton, Keighley, West Yorkshire (GB)

(72) Inventor: Chris Wordley, Keighley (GB)

(73) Assignee: Eldon Technology Limited, Steeton, Keighley (GB)

( * ) Notice: Subject to any disclaimer, the term of this patent is extended or adjusted under 35 U.S.C. 154(b) by 0 days.

(21) Appl. No.: 13/737,832

(22) Filed: Jan. 9, 2013

(65) Prior Publication Data

US 2014/0186014 A1    Jul. 3, 2014

Related U.S. Application Data

(60) Provisional application No. 61/747,539, filed on Dec. 31, 2012.

(51) Int. Cl.
| | |
|---|---|
| *H04N 9/87* | (2006.01) |
| *H04N 21/6587* | (2011.01) |
| *H04N 21/4402* | (2011.01) |
| *H04N 21/433* | (2011.01) |
| *H04N 19/40* | (2014.01) |

(52) U.S. Cl.
CPC ............. *H04N 9/87* (2013.01); *H04N 21/6587* (2013.01); *H04N 21/440281* (2013.01); *H04N 21/4334* (2013.01); *H04N 19/00472* (2013.01)
USPC .......................................................... 386/345

(58) Field of Classification Search
None
See application file for complete search history.

(56) References Cited

U.S. PATENT DOCUMENTS

| | | | | |
|---|---|---|---|---|
| 2001/0031005 | A1* | 10/2001 | Nister et al. | 375/240.16 |
| 2002/0070958 | A1* | 6/2002 | Yeo et al. | 345/723 |
| 2005/0183016 | A1* | 8/2005 | Horiuchi et al. | 715/719 |
| 2006/0120624 | A1* | 6/2006 | Jojic et al. | 382/284 |
| 2006/0263061 | A1* | 11/2006 | Takao | 386/96 |
| 2007/0201830 | A1* | 8/2007 | Rose et al. | 386/95 |
| 2008/0143875 | A1* | 6/2008 | Scott et al. | 348/512 |
| 2008/0172693 | A1* | 7/2008 | Ludvig | 725/40 |
| 2008/0288509 | A1* | 11/2008 | Mysen et al. | 707/100 |
| 2009/0259460 | A1* | 10/2009 | Jia et al. | 704/215 |

FOREIGN PATENT DOCUMENTS

| | | |
|---|---|---|
| WO | 02/102079 A1 | 12/2002 |
| WO | 2011/053271 A1 | 5/2011 |
| WO | 2011/075016 A1 | 6/2011 |

OTHER PUBLICATIONS

European Search Report for EP 13194205, dated Feb. 24, 2014, 2 pages.
European Search Report for EP 13194205, completed May 23, 2014, 6 pages.

* cited by examiner

*Primary Examiner* — Hung Dang
*Assistant Examiner* — Sunghyoun Park
(74) *Attorney, Agent, or Firm* — Kilpatrick Townsend & Stockton LLP

(57) ABSTRACT

Systems and methods for performing automatic content modification or removal are described. An exemplary system may include an electronic device configured to receive video content and/or user inputs. The electronic device may further include one or more processors as well as memory, which when executed by the one or more processors, cause them to review each frame of the received video content and identify instances of sequential frames providing similar content. The one or more processors may further be caused to determine whether at least one of the sequential frames may be removed, remove one or more of the sequential frames to produce modified video content, and transmit the modified video content to one or more display devices.

22 Claims, 6 Drawing Sheets

AUTO CATCH-UP

CROSS-REFERENCES TO RELATED APPLICATIONS

This application claims the benefit of U.S. Provisional Application No. 61/747,539, filed Dec. 31, 2012, and titled "AUTO CATCH-UP." The entire contents of which are hereby incorporated by reference for all purposes.

TECHNICAL FIELD

The present technology relates to systems and methods for content modification. More specifically, the present technology relates to identification and modification of material from video content.

BACKGROUND

When viewing video content that has been paused for a period of time, the only way to catch up to a live position is to perform a fast-forward type function, or entirely skip the missed content. For example, if a viewer is watching a movie and would like to finish the movie on time or early, this may only be possible by fast-forwarding or skipping as necessary. However, such a function may cause the viewer to miss valuable plot details, conversations, or other materials. This may result in frustration for viewers hoping to progress more rapidly through video content without missing important content.

Thus, there is a need for improved methods and systems for identifying and modifying material from video content in a useful way. These and other needs are addressed by the present technology.

SUMMARY

Systems and methods for performing automatic content modification or removal are described. An exemplary system may include an electronic device configured to receive video content and/or user inputs. The electronic device may further include one or more processors as well as memory, which when executed by the one or more processors, cause them to review each frame of the received video content and identify instances of sequential frames providing similar content. The one or more processors may further be caused to determine whether at least one of the sequential frames may be removed, remove one or more of the sequential frames to produce modified video content, and transmit the modified video content to one or more display devices.

The electronic device may include at least one data input component to receive video data, at least one user input component to receive one or more user inputs or instructions, as well as at least one output component communicatively coupled with a display device. In disclosed embodiments, the identification may include determining whether at least 80% or 90% or some other amount of the displayed content of the second frame is similar to the content of the first frame. The determination may further include identifying whether voice audio content is being provided with the sequential frames of the video content. The determination may include confirming that no voice audio content is being provided with the sequential frames of the video content, and that the similarity of content between the first and second frames meets or exceeds a threshold of similarity. The processors may be further caused to display a menu on the output device prior to reviewing the video content frames, where the user may interact with the menu to adjust one or more functions of the auto catch-up application.

Methods for performing an auto catch-up function are also provided. An exemplary method may include the step of receiving video data at an electronic device, and reviewing each frame of the received video content. The methods may include identifying instances of sequential frames providing similar content at the electronic device, and determining at the electronic device whether at least one of the sequential frames may be removed. The methods may also include removing at least one of the sequential frames to produce modified video content at the electronic device, and then transmitting the modified video content from the electronic device to one or more display devices.

The identification may include comparing the content of the second of the sequential frames to the content of the first of the sequential frames. The identification may also include comparing the content of at least three subsequent frames. The determination may include identifying whether voice audio content is being provided with the at least three subsequent frames of the video content. The determination may further include confirming that no voice audio content is being provided with the subsequent frames of video content, and that the similarity of content between the at least three subsequent frames meets or exceeds a threshold of similarity, which may be at least 90% similarity of the displayed content between the at least three subsequent frames. The removal may include removing the second of the at least three subsequent frames.

The methods may also include transmitting a menu for display on one or more display devices with which the user can interact. The electronic device may receive a user instruction via the menu to proceed with the video content review. The menu may include options for the video content review including a quality setting of removal, where a lower quality setting may include a higher rate of content removal. The menu may include options that include a suggested quality setting to enable a complete or partial catch-up.

Such technology may provide numerous benefits over conventional techniques. For example, a user may not need to manually skip content, which may cause the user to miss valuable content. Additionally, by allowing the user the ability to the determine the quality with which to perform the catch-up, a user may be able to determine the amount of catch-up to be performed and the amount of material to be missed. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to performing an auto catch-up function by removing video content material, or otherwise modifying its transmission. The technology can allow users to regain lost time from a movie, broadcast, or other video content, while still receiving a full engagement of the included story or information. In so doing, improved user experiences may be delivered, along with reducing frustration of having to manually fast-forward through content at the expense of the enjoyment of what may be missed. These and other benefits will be explained in detail below.

Although embodiments detailed herein are directed toward controlling television based equipment, the principles easily can be extended to other types of content and devices, such as DVD equipment, digital video recorder (DVR) equipment, video game equipment, computer equipment, handheld electronic devices, and the like. In addition, the terms "television" or "television service" can include traditional television programming, such as linear television programs, as well as other types of audio, video and/or audio/video content, such as on-demand video content, streaming video content and the like delivered via any type of content delivery systems, such as cable, satellite, cellular/wireless, Internet/IP, and/or any other content delivery technology or system currently known or hereafter developed. Furthermore, embodiments herein describe set-top boxes and/or other devices being connected with a television or other device having an electronic display. However, the electronic device can also be incorporated into or be a part of the device having the display or display device, such as a television with an integrated cable, satellite or IPTV receiver. Alternatively, the electronic device may be a DVR or DVD player including the present technology. The technology discussed herein additionally can be extended to any of a variety of other electronic devices, display devices, or combined devices, such as, for example, computers, tablets, handheld mobile devices, cell phones, e-readers, personal media players, and the like. A person of ordinary skill in the art will recognize various alterations, additions, omissions, and substitutions.

Figure 1:
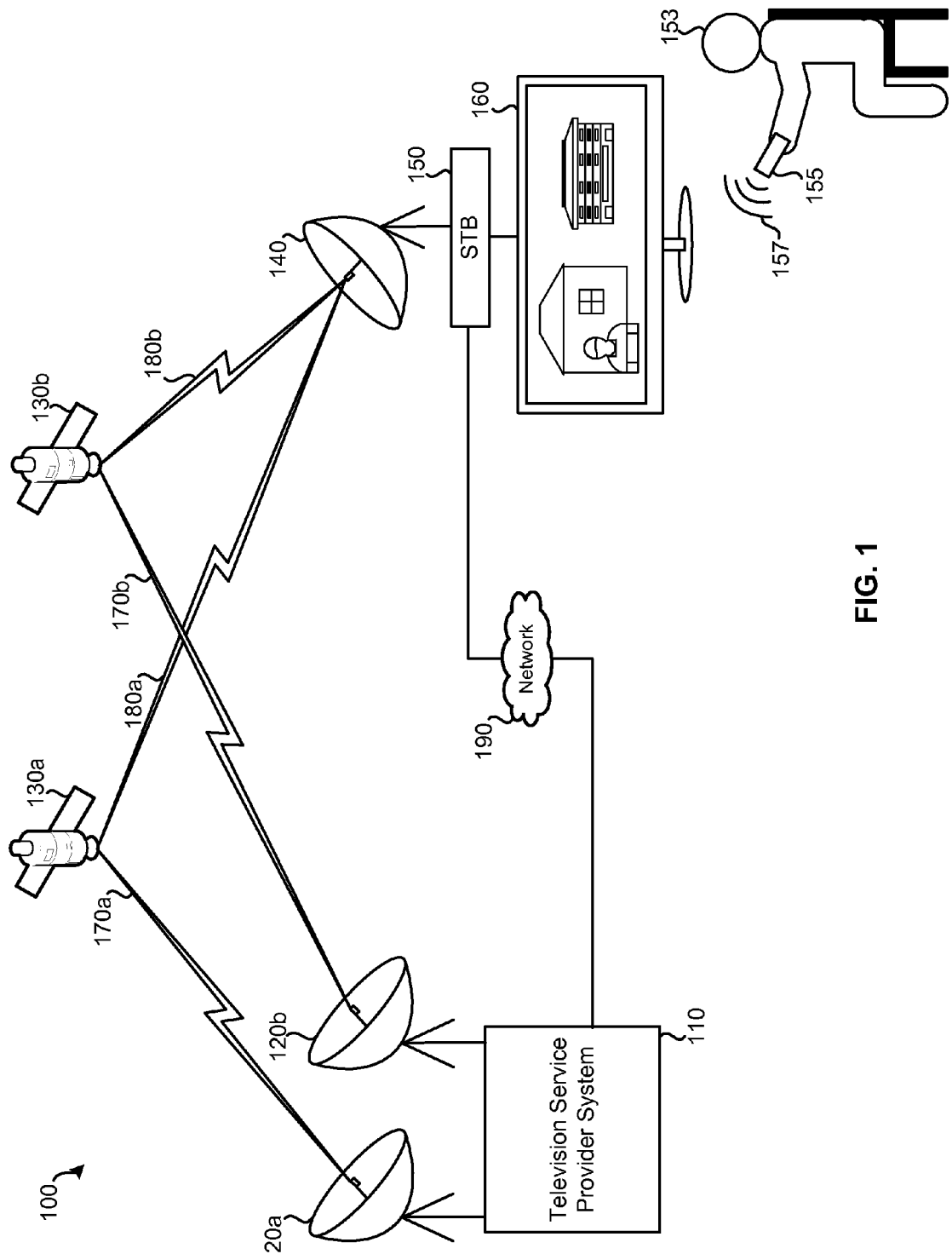
FIG. 1 shows a simplified media service system that may be used in accordance with embodiments of the present technology.

FIG. 1 is a simplified illustration of an embodiment of a satellite television distribution system 100. Satellite television distribution system 100 may include: television service provider system 110, satellite transmitter equipment 120, satellites 130, satellite dish 140, set-top box (STB) 150, and television 160. The television 160 can be controlled by a user 153 using a remote control device 155 that can send wireless signals 157 to communicate with the STB 150 and/or television 160. Although discussed as being wireless for user convenience, the technology may additionally include a wired coupling between the remote control device 155 and STB 130 or television 160. Alternate embodiments of the satellite television distribution system 100 may include fewer or greater numbers of components. While only one satellite dish 140, STB 150 and television 160, collectively referred to as user equipment, are illustrated, it should be understood that multiple (tens, thousands, millions, etc.) instances of user equipment may be connected within the data communication network 190.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130a. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
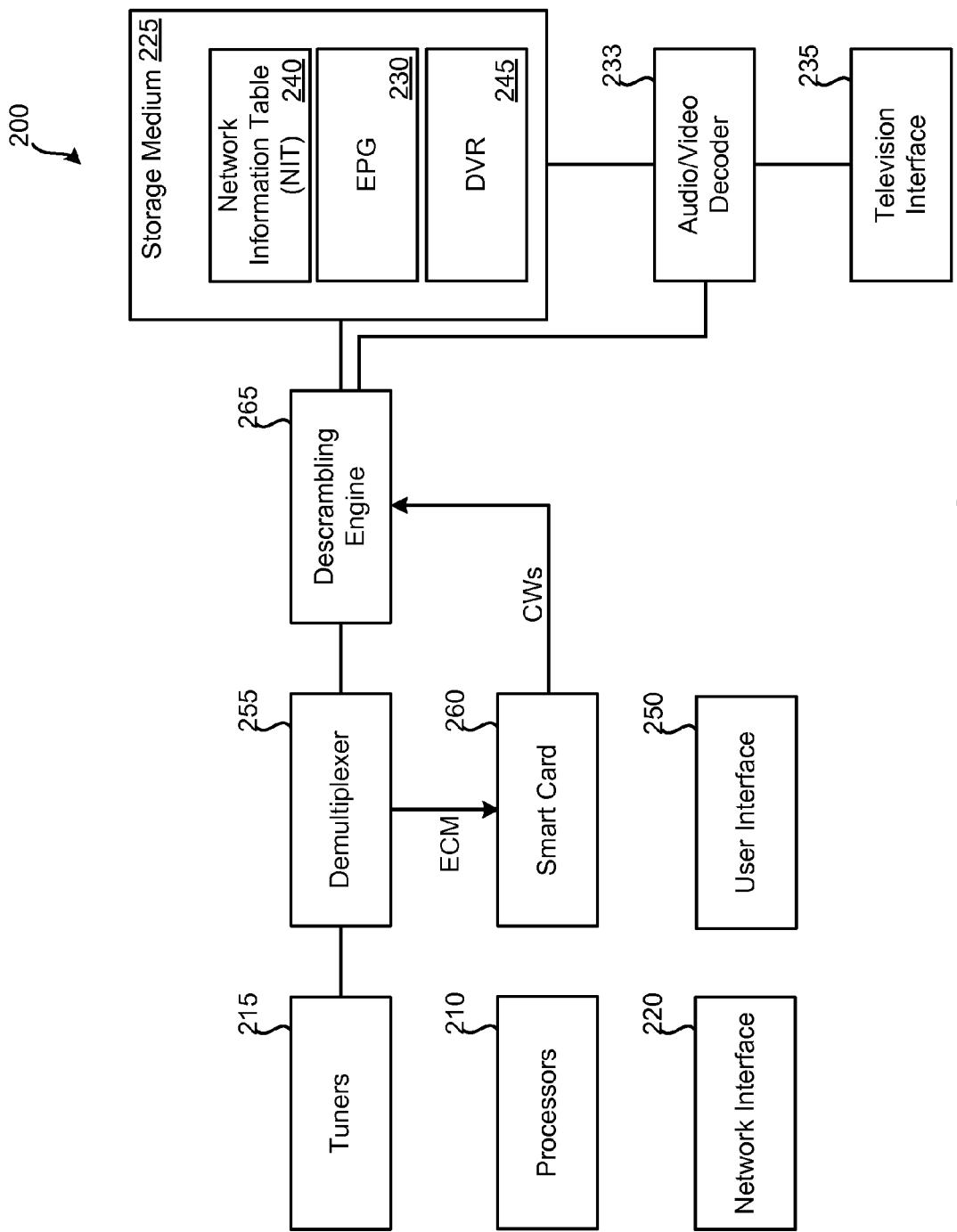
FIG. 2 illustrates an exemplary electronic device that may be used in accordance with embodiments of the present technology.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional details of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170a represents a signal between satellite uplink 120a and satellite 130a. Uplink signal 170b represents a signal between satellite uplink 120b and satellite 130b. Each of uplink signals 170 may contain streams of one or more different television channels. For example, uplink signal 170a may contain a certain group of television channels, while uplink signal 170b contains a different grouping of television channels. Each of these television channels may be scrambled such that unauthorized persons are prevented from accessing the television channels.

Transponder stream 180a represents a signal between satellite 130a and satellite dish 140. Transponder stream 180b represents a signal path between satellite 130b and satellite dish 140. Each of transponder streams 180 may contain one or more different television channels in the form of transponder streams, which may be at least partially scrambled. For example, transponder stream 180a may include a first transponder stream containing a first group of television channels, while transponder stream 180b may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region, e.g., to distribute local television channels to the relevant market. Different television channels may be transmitted using the same frequency of the transponder stream to a different geographic region.

FIG. 1 illustrates transponder stream 180a and transponder stream 180b being received by satellite dish 140. For a first group of television channels, satellite dish 140 may receive a transponder stream of transponder stream 180a; for a second group of channels, a transponder stream of transponder stream 180b may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood, however, that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. It is also to be understood that the technology disclosed herein can be practiced on and by cable, satellite, internet-based, over-the-air, or any other system that distributes video for display.

FIG. 2 illustrates a block diagram of an embodiment of a set-top box 200, or alternatively a television receiver 200. STB 200 may be set-top box 150 of FIG. 1, or may be incorporated as part of a television, such as television 160 of FIG. 1. STB 200 may include: processors 210, tuners 215, network interface 220, non-transitory computer-readable storage medium 225, electronic programming guide (EPG) 230, television interface 235, networking information table (NIT) 240, digital video recorder (DVR) 245, user interface 250, demultiplexer 255, smart card 260, and/or descrambling engine 265. In other embodiments of STB 200, fewer or greater numbers of components may be present. It should be understood that the various components of STB 200 may be implemented using hardware, firmware, software, and/or some combination thereof. For example, EPG 230 may be executed by processors 210.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by processor 210.

Tuners 215 may include one or more tuners used to tune to television channels, such as television channels transmitted via satellite or cable. Network interface 220 may be used to communicate via an alternate communication channel with a television service provider. Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or DVR 245. Recorded television programs may be stored using storage medium 225.

EPG 230 may store information related to television channels and the timing of programs appearing on such television channels. EPG 230 may be stored using non-transitory storage medium 225, which may be a hard drive. Audio/video decoder 233 may serve to convert encoded video and audio into a format suitable for output to a display device. Television interface 235 may serve to output a signal to a television (or another form of display device) in a proper format for display of video and playback of audio. The network information table (NIT) 240 may store information used by set-top box 200 to access various television channels. Digital Video Recorder (DVR) 245 may permit a television channel to be recorded for a period of time. DVR 245 may store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or DVR 245 tunes to a first television channel, NIT 240 may be used to determine the satellite, transponder, ECM PID (packet identifier), audio PID, and video PID.

User interface 250 may include a remote control (physically separate from STB 200) and/or one or more buttons on STB 200 that allows a user to interact with STB 200. User interface 250 may be used to select a television channel for viewing, view EPG 230, and/or program DVR 245. Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. Descrambling engine 265 may use the control words output by smart card 260 in order to descramble video and/or audio corresponding to television channels for storage and/or presentation.

For simplicity, STB 200 of FIG. 2 has been reduced to a block diagram, and commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a fewer number of modules or divided into a greater number of modules. Further, the components of STB 200 may be part of another device, such as built into a television. Also, while STB 200 may be used to receive, store, and present television channels received via a satellite, it should be understood that similar components may be used to receive, store, and present television channels via a cable network. Although STB 200 is identified as a suitable device with which to practice the disclosed technology, it is to be understood that any number of devices may be utilized that are capable of transmitting, displaying, of processing video content, including televisions, DVRs, DVD players, hand-held devices, tablets, computers, etc.

Figure 3:
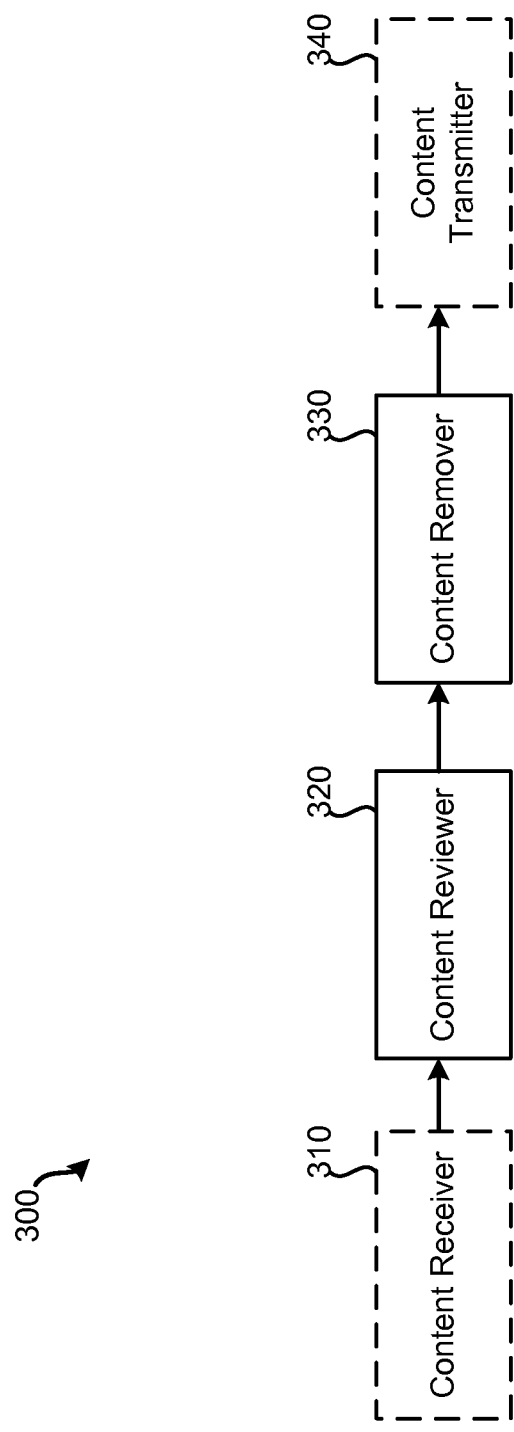
FIG. 3 illustrates modular components that may be used in accordance with embodiments of the present technology.

FIG. 3 is an illustration of an embodiment of modular components of an application 300 that may include hardware, software, firmware or any such combination, which may be used to perform the present technological functions. In disclosed embodiments, application 300 may include more or less modules, and the modules may additionally be separated into multiple modules, or the modules may be combined. The modules may additionally be aspects of more than one application run by one or more processors, such as processors 210 of device 200, or processors 610 described below. The application may be stored in memory such as memory 635 as described in detail below. In this embodiment, the modules may be run concurrently, in differing order, or without one or more of the specified modules in order to perform the technological functions described herein. The modules of application 300 will be discussed in reference to STB 200 as previously described, but it is to be understood that the application 300 may be incorporated with a variety of other electronic devices including a DVR, DVD player, television, computer, tablet, or hand-held device.

An electronic device, such as STB 200 as previously discussed with respect to FIG. 2, may include at least one input component configured to receive video content, such as from television service provider 110, or from an incorporated or otherwise connected video content player such as a DVR or DVD player. Additionally, STB 200 may be configured to receive video data from additional sources accessed via network 190. STB 200 may also include at least one user input component configured to receive one or more user instructions, such as from remote control 155. STB 200 may include at least one output component communicatively coupled with a display device, such as television 160. The electronic device may be directly coupled with the display device or otherwise in communication with the device such that video data may be transmitted wirelessly, for example. The STB 200 may also be configured with multiple output components, which may be configured to provide video data to multiple display devices. The STB 200 may send a main video as received from the service provider to the main display device, such as television 160, and also send an additional video data stream to an additional display device, such as a laptop, smartphone, or other device capable of receiving a video display (not shown).

The electronic device may include one or more processors, as well as memory, that coordinate to perform the application 300. In operation, optionally included content receiver 310 may receive video content as received into the electronic device, or other electronic device. The content receiver 310 may be optional, for example, or unnecessary in the case of a DVD player, which may generate the content from an inserted disc. Content reviewer 320 may be communicatively coupled with content receiver 310, and may be configured to identify features or aspects of each frame of the video content. The content reviewer 320 may compare each successive frame of video to determine either similarities or differences between the frames. For example, the reviewer 320 may compare the content of a second of a pair of sequential frames to the content of the first of the sequential frames. The reviewer 320 may be configured to review any number of frames at a time, including up to or about 1, 2, 3, 5, 10, 20, 30, 50, 60, 100, 120, 200, 240, etc. or more. The reviewer may review sequential frames to identify frames or successive frames providing similar content. For example, a degree of similarity may be used based on any number of if not all identifying features of a frame. If the features are determined to match with a subsequent frame, the two frames may be determined to contain similar content. The reviewer may be programmed or operatively adjusted to qualify what is to be similar content. For example, if substantially seamless or seamless content delivery is required, the reviewer may only determine frames to be similar if they have above 90% similar features, e.g., a second of two sequential frames may have 90% similarity with the first or previous of the two sequential frames. This threshold for review may be predetermined or adjusted based on the amount of material to be removed, for example. For example, the threshold may be up to 100% similarity, or be greater than or about 50%, 60% 70%, 75%, 80%, 85%, 90%, 95%, etc.

The review may additionally or alternatively be based on the amount of content that needs to be removed. For example, a viewer may be watching a movie scheduled before a sporting event. After the movie has begun, the user may pause and record the movie to receive a telephone call, for example. After the call or other delay which may run any amount of time, such as for up to or about 2 minutes, 5 minutes, 10 minutes, etc. or more, up to hours of time, the user may return to proceed with the movie. However, the user may determine that he wishes to recoup the lost time in order to be prepared for the sporting event. For example, if the delay was for two minutes, the electronic device such as STB 200 may have recorded the received video during this time with a DVR, for example. Upon playback, the user may instruct the STB or other electronic device to perform the auto catch-up function such as by using application 300. The application may then calculate the number of frames that are needed to be removed or sped past in order to catch up. This determination may further consider the amount of time during which the catch-up is to occur. For example, if the movie is two hours, and the delay happened within the first five minutes, the application may have one hour and fifty-five minutes in which to catch up two minutes. However, if there are only forty-five minutes remaining when the delay occurs, the catch up may be performed more quickly, and in a similar or different fashion.

Once the content reviewer has identified sequential frames providing similar content, content reviewer 320 or content remover 330 may be used to determine whether at least one of the sequential frames may be removed. For example, depending on the quality setting for playback, amount of time to be recovered, amount of time during which the recovery may occur, etc., the application 300 may determine more suitable and less suitable frames for removal. If the application 300 is to be run more aggressively, such as if a longer amount of time is to be recovered, any frame meeting threshold requirements previously defined or input by a user, for example, may be removed. Alternatively, if a relatively short amount of time is to be recovered, and a relatively long period of time is available for the recovery, the application may be able to modify preset threshold requirements, or otherwise determine that more suitable material is available for deletion. Accordingly, the application 300 may intelligently determine some or all of the material to be removed, and these decisions may be adjusted over time, such as during the progression of the video content. For example, the application 300 may determine that a relatively high-quality playback is to be afforded because only one minute of time may need to be recovered over a period of two hours. However, if the video is relatively high action, for example, the application may determine some period of time later that an insufficient number of frames have been removed to stay on target. Accordingly, the application may adjust the ways in which material is removed in order to overcome the issue. The application may inform the user, for example via a display, that the settings are going to be modified, and the user may allow this to occur, or otherwise provide instructions for how the application should continue.

Once the application 300 has determined at least one frame to be removed, content remover 330 may remove that frame as the video is to be delivered such that one less frame, and a shorter transmission will occur. The content remover may produce a modified video based on the removed content that may or may not actually delete the removed content. For example, if application 300 is utilized in conjunction with a DVD player, for example, the application may not deliver every frame based on the removed frames from the application, but this material is still available on the DVD if the user so desires to watch the video in full. Alternatively, if a viewer has paused live television, such as with a DVR function on an STB, the application may actually delete the frames that are being removed, if the content is not otherwise being recorded by the viewer. However, the content may additionally be stored so that the viewer may rewind and play back material, such as in the event that application 300 inadvertently deletes or speeds up material of significance to the user, for example.

The content remover 330 may alternatively or additionally adjust the playback of material. For example, the content reviewer may recognize that ten seconds of material such as a panning shot of a landscape are occurring. The content remover may perform frame removal as described, or may additionally or alternatively perform a speed-up operation that will increase the rate at which the video is played. For example, for those ten seconds, the content remover may double, or some greater or lesser amount, the frame rate at which the frames are delivered to a display such that the panning shot occurs in five seconds. Alternatively, the rate may be increased and frames may be removed in order to provide any type of adjustment of the video content. The amount of rate increase, or frame removal, or both may be determined by the application based on the amount of material that is to be removed, or some other factor as previously discussed. Once the modified video has been produced, the video may be transmitted to a display device or back though other features of the electronic device via optional content transmitter 340.

Additional material may be reviewed concurrently with, in addition to, or alternatively to the video content. For example, the content reviewer may also identify whether voice audio content is being provided with the sequential frames of the video content, and utilize this information in the determination of whether one or more frames is to be removed. For example, in a movie scene in which two characters are speaking but there is otherwise no action, the video content may be similar at a threshold of over 95%. However, if one or more frames are removed, words or sounds may be lost that may be important for a viewer to hear. Accordingly, the application 300 may be further configured to include the audio content, such as voice content, into the determination of whether frames are to be removed. The audio content may be parsed by the application 300 in order to differentiate conversation, background noise, music, etc. The different audio content may be ranked or otherwise given priority in the determination of whether frames are to be removed. For example, the determination may confirm that no voice audio content is being provided with the sequential frames of the video content, and that the similarity of content between the first and second frames, or other number of frames, meets or exceeds a threshold of similarity. Based on this or any of a variety of similar determinations, one or more frames may be identified for removal or rate increase as previously discussed.

The electronic device may include user inputs as previously identified for receiving user instructions or otherwise allowing the user to interact with application 300. For example, a user may instruct the device to transmit for display a menu with which the user may interact. The menu may allow the user to enable the catch-up application 300, such as after the user has determined that a catch-up operation is required. The user may confirm to perform the catch-up, or provide parameters for performing the catch-up, after which the review of the video content may begin, or alternatively, previously reviewed video may now be modified as discussed above. For example, the user may instruct a partial or full catch-up to be performed, or a user may identify a quality level of playback such that the application may determine or estimate the amount of catch-up that may be available. Additional aspects of the menu are described further below.

Figure 4:
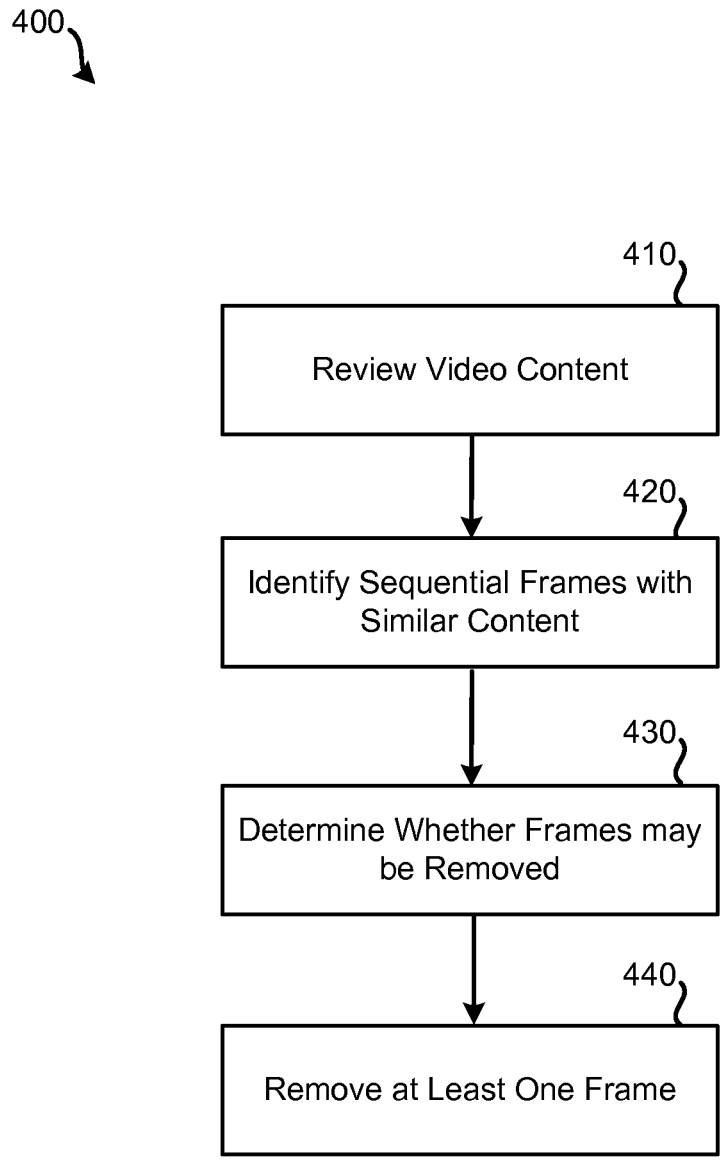
FIG. 4 shows a simplified flow diagram of a method for performing an auto catch-up according to embodiments of the present technology.

The systems and devices previously described may be used in performing various methods. FIG. 4 illustrates an embodiment of a method 400 for performing an auto catch-up function. Method 400 may be performed using any of the systems or components previously described. Method 400 may allow for user control or instruction to an electronic device to enable removal or speeding up of video content. Each step of method 400 may be performed at or by a single electronic device, such as an STB, DVR, or mobile device, for example, or by multiple devices communicating with one another. Means for performing each step of method 400 include an electronic device and/or the various components of an electronic device or distribution system, such as those detailed in relation to FIGS. 1-3. Method 400 may be performed using a computerized device, such as a device incorporating some or all of the components of computer system 600 of FIG. 6.

At step 410, video content may be reviewed at an electronic device. The review may be to compare various aspects or features of the video content on a frame-to-frame basis. Each frame may be compared to previous or subsequent frames to determine whether features including scene or setting materials, character materials, etc., are similar or identical between frames. At step 420, sequential frames with similar content may be identified at the electronic device or by the application. The identification may be simply recognizing that a frame of content includes similar features as the previous frame, or more detailed analysis may be performed. For example, a group of frames may be analyzed together to determine the degree of feature changes across the group of frames. For example, the identification may include analysis of features of the video content to determine that 90% of features, for example, are similar across a group of 3, 5, 10, 120, 1200, etc. or more frames.

Once frames have been identified having similar content across the frames, a determination may be made at step 430 regarding whether frames may be removed. The determination may be based on a threshold of similarity between the features, such as over 80% similarity between the frames. The threshold may be predetermined prior to the identification and utilized at that step. The determination may factor in variables including amount of time that must be recovered, for example, to facilitate when material should be removed, and how much of the material should be removed. Once the determination to remove material has been made, material may be removed or sped up at step 440. For example, if a relatively short amount of recovery is required, a single frame may be removed from a group of 100 frames identified as similar, or the frames may be played at a rate that is 10% faster than the standard rate. For example, if the video content should be delivered at 60 frames per second (fps), the rate may be increased to 66 fps, for example. Alternatively, if a relatively long amount of recovery is required, or a shorter period during which the recovery is to occur, 20 frames may be removed from a group of 100 frames, or a percentage of similar frames may be removed that may be up to 10%, 20%, 30%, 40%, 50%, etc., or more. Again, the rate may additionally be increased such that 10 seconds of material is doubled in transmission rate such that it is played in 5 seconds. Such alternative examples may be combined in any number of ways until such time as the catch-up has been achieved. Additionally, the ways in which material is removed or modified may be adjusted as the video content progresses. For example, if the removal is occurring faster than needed, the application may slow the rate of removal, or vice versa. This may be dependent on the video content itself, such as the amount of action, dialogue, etc. Including the intelligence discussed with the disclosed technology, the application may alter the ways in which material is removed to provide the most streamlined delivery of content.

Figure 5:
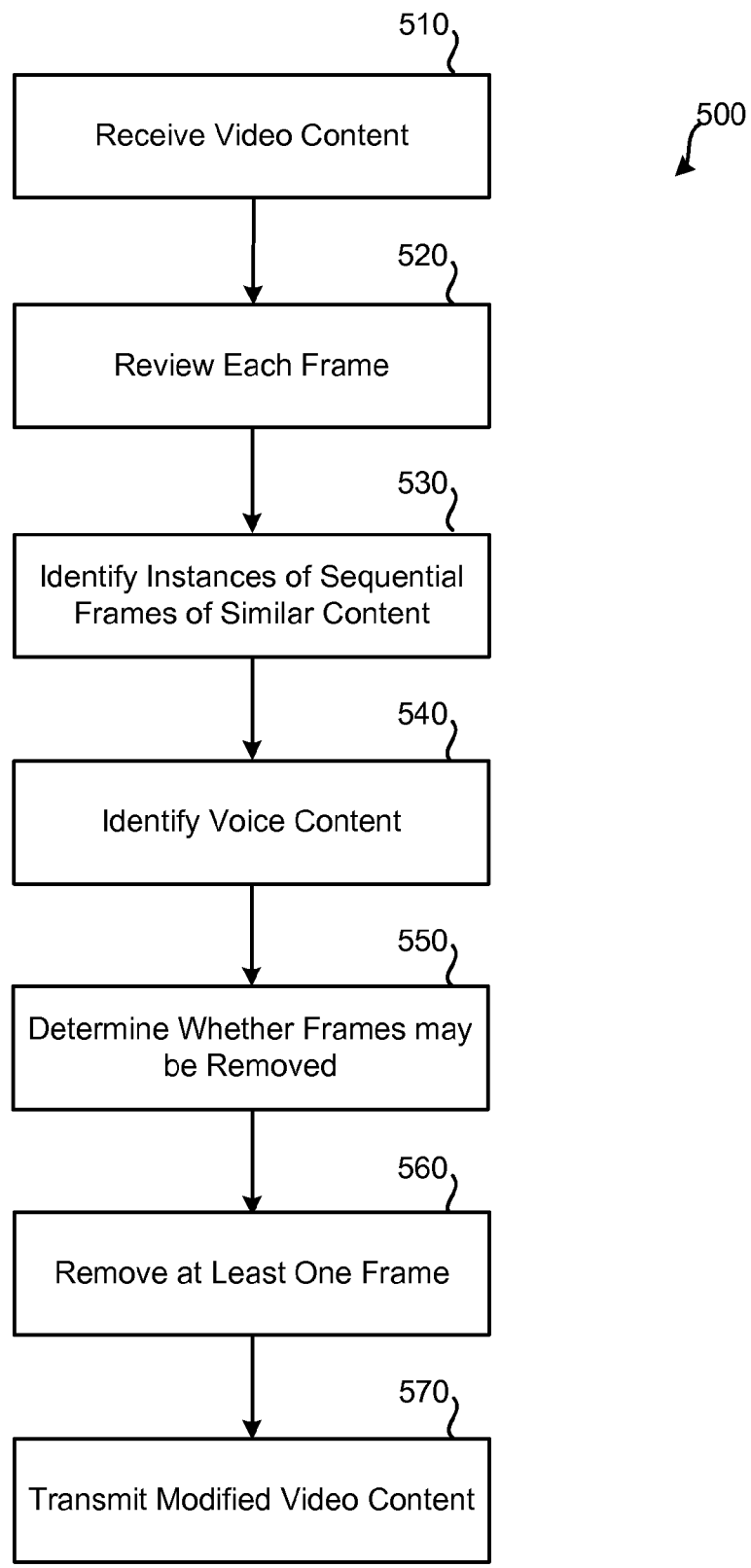
FIG. 5 shows another simplified flow diagram of a method for performing an auto catch-up according to embodiments of the present technology.

FIG. 5 illustrates another embodiment of a method 500 for performing an auto catch-up function. Method 500 may be performed using any of the systems or components previously described. Method 500 may allow for user control or instruction to an STB, or other electronic device, in order to perform video content removal or rate increases. Each step of method 500 may be performed by an electronic device, such as an STB, DVR, etc., or may be performed with more than one device in communication with one another. Means for performing each step of method 500 include a first electronic device and/or the various components of an electronic device or distribution system, such as those detailed in relation to FIGS. 1-3. Method 500 may represent a more detailed embodiment of method 400. Method 500 may be performed using a computerized device, such as a device incorporating some or all of the components of computer system 600 of FIG. 6.

At step 510, video data may be received at an electronic device. The video data may be received from a provider, such as television service provider 110, or may be received from an alternative source, such as any source providing video data over a network, such as network 190, or an external or internal DVD, DVR, or other video input device. Each frame of the video content received may be reviewed at the electronic device at step 520. The review may compare aspects or features included in the video content. For example, features may be compared frame-to-frame, or the location of items, colors, or shapes within a frame may be compared between frames as well. Instances of sequential frames or subsequent frames of similar content may be identified at step 530. The identification may include comparing the content of the second of the sequential frames to the content of the first of the sequential frames. The identification may determine a percent of similarity between the frames or across a series of frames. For example, the identification may include comparing the content of at least three subsequent or sequential frames, five subsequent or sequential frames, sixty subsequent or sequential frames, 240 subsequent or sequential frames, 2400 subsequent or sequential frames, etc., or more and determine a percentage of similarity between successive frames, across the group of frames, at intermediate frames within the group, etc.

At step 540, the received content or additional audio content may be reviewed to identify whether voice audio content is being provided with the video content. For example, when the comparison of at least three subsequent or sequential frames is performed, audio content to be delivered with the frames may be reviewed to determine whether voice audio content, music content, or background noise content is being delivered with the at least three subsequent or sequential frames. A determination may be performed at step 550 of whether at least one of the frames may be removed from the received content. The determination may include confirming that no voice audio content is being provided with the subsequent or sequential frames of the video content. The determination may also include a confirmation that the similarity between the frames, such as the at least three subsequent or sequential frames meets or exceeds a threshold of similarity, such as 90% similarity of the displayed content between the frames, such as the at least three sequential frames. Additional levels of predetermined similarity or adjusted levels of similarity may be used as previously described, or as determined by the application so as to produce the required content removal. The determination may also further review the audio content. For example, music or background noise may be occurring simultaneously with the material to be sped up or removed. The application may determine that, for example, a similar pitch musical tone is occurring between successive frames, and as such a frame or a set of frames may be removed without affecting the audio playback beyond shortening a tone. In such a way, the quality of adjustment may be such that the user is unaware of the removal.

Once frames have been determined for removal, at least one frame may be removed at step 560. The removal may involve actual removal of material, or may alternatively and/or additionally involve the increased speed of playback of material. The removal may occur based on the number of frames reviewed in disclosed embodiments. For example, if each frame is being reviewed in comparison to the previous frame, a matching frame may simply be dropped from playback or transmission. Alternatively, if multiple frames, such as at least three subsequent or sequential frames are being reviewed, one or more of the frames may be removed. For example, if identical or substantially identical material is located in each frame, or features above a certain threshold of similarity occur within each of the frames, the second frame may be removed because the first and third frame are within a determined or predetermined tolerance of consistency of material.

Such a removal may be scaled as appropriate as well. For example, if video transmission is occurring at 60 fps, for example among any known or developed transmission speeds, successive frames need not be reviewed. In disclosed embodiments, the first, fifth, and tenth frames may be reviewed, or the first, tenth, eleventh, and twentieth frames may be reviewed to determine if multiple frames may be removed. In alternative embodiments, any number of intermediate frames may be reviewed or skipped depending on the speed of transmission or the capabilities of the particular application. The review may be based on any pattern or random number of intermediate frames, or may be based on timing between frames. For example, the first, third and tenth frames may be reviewed, or frames may be reviewed at intervals such as seconds or fractions of seconds or milliseconds. Such patterns may allow for the removal of one or more frames of material based on the consistency of displayed material across the pattern of frames of the video content. Once material has been removed, a modified video content may be produced that is transmitted to one or more display devices at step 570. The display device may be any display device in communication with the electronic device. The display may include a television, computer, mobile phone, or any type of LCD, LED, plasma, or other screen technology.

The auto catch-up function may be performed automatically upon the resumption of a program that has been paused, or may be otherwise engaged by a user. For example, prior to the review, upon resumption of the program, or when a user is prepared to resume the video content, the user may engage a menu deliverable from a user instruction, such as utilizing remote control 155. Alternatively, after material has been paused or stopped, upon resumption the electronic device may automatically transmit a menu to the display for interaction by the user. From the display of the menu, the user may simply acknowledge that the auto catch-up should be engaged, or may alternatively cancel from the menu and resume normal, although delayed operation. If the user desires that auto catch-up should be performed, the user may provide an instruction to proceed with the video content review. The menu may provide additional options or sub-menus that allow the user to further engage with the catch-up operation. For example, the menu may include options for the video content review including a quality setting of removal or catch-up. Additionally, upon receiving an instruction to proceed with the content review, the menu may display an identification performed by the application of the amount of catch-up to be performed and the available time in which to perform the catch-up.

The menu may additionally display a suggested quality of removal to be performed, such as a setting to enable complete catch-up, or options for the quality based on the reviewed information. This information may continually update as the program is still paused, while the user is making a decision regarding the type of removal to be performed. For example, the lower the quality setting, the higher rate of removal may be performed. In such a case, if a user was interested in recovering, for example, ten minutes of time in one hour, this may require a noticeable amount of deleted material. A warning may be provided to the user in such a case that noticeable skipping or material loss may occur. The user may subsequently determine that a reduced amount of recovery may be sufficient. For example, despite that the transmission may be delayed ten minutes, the user may accept that an estimate closer to two minutes may be recovered with less notice to the displayed content. It will be understood that a variety of such situations are similarly encompassed by the technology.

The technology may be further utilized for normal commercial broadcast as well. Unlike conventional technology that may require fast-forwarding operations over advertisements with pre-recorded material, the disclosed technology may be utilized to remove commercials from the regular transmission. For example, if a user were to pause and record a broadcast or other transmission with any of the previously identified devices, upon resumption of the transmission, the user may enable the auto catch-up function. The user may select, such as via a menu option, to remove commercials from the transmission. Accordingly, the application may analyze the video content for advertisements. For example, advertisements may include markings or other identifications recognizable by the application or the electronic device such that the application is immediately aware of commercial content in relation to program content. This material may be removed via the disclosed technology, such that seamless transmission between segments of the transmission or broadcast may be afforded. In this way, a user may avoid the frustration of having to skip over commercial content as the application may provide this function automatically. Additionally, if material or video content such as an entire commercial program is completely recorded prior to playback, the application may be enabled at the start of transmission, and all commercial material may be removed for the user across the entire program. Various other examples will be similarly appreciated utilizing the disclosed technology.

Figure 6:
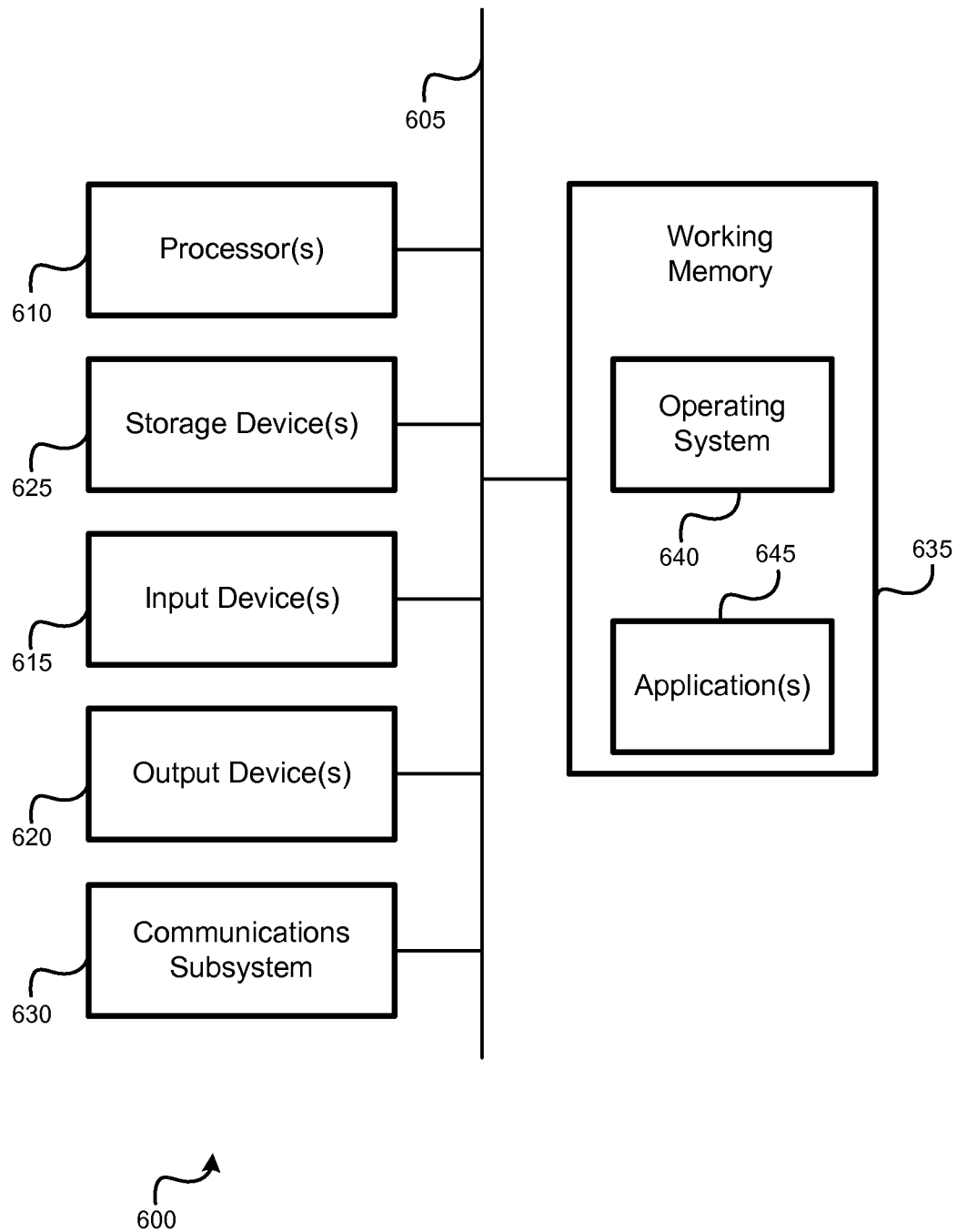
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, a camera, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 630 may include one or more input and/or output communication interfaces to permit data to be exchanged with a network (such as the network described below, to name one example), other computer systems, television, and/or any other devices described herein. Depending on the desired functionality and/or other implementation concerns, a portable electronic device (or similar device) may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 4 and 5, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the technology. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 825 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of examplary configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bound the scope of the claims.

Where a range of values is provided, it is understood that each intervening value, to the smallest fraction of the unit of the lower limit, unless the context clearly dictates otherwise, between the upper and lower limits of that range is also specifically disclosed. Each smaller range between any stated value or intervening value in a stated range and any other stated or intervening value in that stated range is encompassed. The upper and lower limits of those smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a switch" includes a plurality of such switches, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An electronic device comprising:
at least one input component configured to receive video content;
at least one output component communicatively coupled with at least one display device, wherein the at least one output component is configured to transmit the video content to the at least one display device;
one or more processors; and
memory communicatively coupled with and readable by the one or more processors and having stored therein processor-readable instructions, which when executed by the one or more processors cause the one or more processors to:
review each frame of the received video content,
determine an amount of time to be removed from the video content,
calculate a number of frames to be removed that corresponds to the amount of time to be removed from the video content,
identify instances of sequential frames providing similar content,
determine whether at least one of the sequential frames may be removed from each identified instance of sequential frames providing similar content,
remove at least one of the sequential frames from each identified instance of sequential frames providing similar content until the number of frames removed equals the number of frames calculated to be removed to produce modified video content not including the removed frames, and
transmit the modified video content to the at least one display device.

2. The electronic device of claim 1, wherein the identification comprises comparing the content of the second of the sequential frames to the content of the first of the sequential frames.

3. The electronic device of claim 2, wherein the comparison comprises determining whether at least 80% of the displayed content of the second frame is similar to the content of the first frame.

4. The electronic device of claim 3, wherein comparison comprises determining whether at least 90% of the displayed content of the second frame is similar to the content of the first frame.

5. The electronic device of claim 2, wherein the determination further comprises identifying whether voice audio content is being provided with the sequential frames of the video content.

6. The electronic device of claim 5, wherein the determination further comprises confirming that no voice audio content is being provided with the sequential frames of the video content, and that the similarity of content between the first and second frames meets or exceeds a threshold of similarity.

7. The electronic device of claim 1, wherein the electronic device further comprises a user input component configured to receive one or more user instructions, and wherein the processor-readable instructions, when executed by the one or more processors, further cause the processors to receive a user instruction to display a menu on the output device, prior to reviewing the video content frames.

8. The electronic device of claim 7, wherein, in response to displaying a menu, an additional instruction is received to proceed with the video content frame review.

9. The method of claim 1, wherein the received video content comprises commercial-free video content.

10. The method of claim 1, wherein the amount of time to be removed equals at least a portion of an amount of time that playback of the video content was paused.

11. A method of performing an auto catch-up function, the method comprising:
receiving, at an electronic device, video content;
reviewing, at the electronic device, each frame of the received video content;
determining, at the electronic device, an amount of time to be removed from the video content,
calculating, at the electronic device, a number of frames to be removed that corresponds to the amount of time to be removed from the video content,
identifying, at the electronic device, instances of sequential frames providing similar content;
determining, at the electronic device, whether at least one of the sequential frames may be removed from each identified instance of sequential frames providing similar content;
removing, at the electronic device, at least one of the sequential frames from each instance of sequential frames providing similar content until the number of frames removed equals the number of frames calculated to be removed to produce modified video content not including the removed frames; and
transmitting, from the electronic device, the modified video content to one or more display devices.

12. The method of claim 11, wherein the identification comprises comparing the content of the second of the sequential frames to the content of the first of the sequential frames.

13. The method of claim 12, wherein the identification comprises comparing the content of at least three subsequent frames.

14. The method of claim 13, wherein the determination further comprises identifying whether voice audio content is being provided with the at least three subsequent frames of the video content.

15. The method of claim 14, wherein the determination further comprises confirming that no voice audio content is being provided with the subsequent frames of the video content, and that the similarity of content between the at least three subsequent frames meets or exceeds a threshold of similarity.

16. The method of claim 15, wherein the threshold of similarity is at least 90% similarity of the displayed content between the at least three subsequent frames.

17. The method of claim 16, wherein the removal comprises removing the second of the at least three subsequent frames.

18. The method of claim 11, further comprising transmitting a menu for display.

19. The method of claim 18, further comprising receiving, at the electronic device, a user instruction to proceed with the video content review.

20. The method of claim 18, wherein the menu includes options for the video content review including a quality setting of removal.

21. The method of claim 20, wherein the menu further comprises a suggested quality setting to enable a complete catch-up.

22. The method of claim 20, wherein a lower quality setting comprises a higher rate of content removal.

* * * * *